(12) United States Patent
Gardner et al.

(10) Patent No.: US 9,065,884 B2
(45) Date of Patent: *Jun. 23, 2015

(54) JOINT TRANSMISSION OF MULTIPLE MULTIMEDIA STREAMS

(75) Inventors: William R. Gardner, San Diego, CA (US); Richard D. Lane, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/464,827

(22) Filed: May 4, 2012

(65) Prior Publication Data

US 2012/0219013 A1 Aug. 30, 2012

Related U.S. Application Data

(63) Continuation of application No. 10/282,797, filed on Oct. 28, 2002, now Pat. No. 8,204,079.

(51) Int. Cl.
*H04L 29/06* (2006.01)
*H04N 7/52* (2011.01)
*H04N 21/2343* (2011.01)
*H04N 21/2385* (2011.01)

(52) U.S. Cl.
CPC .............. *H04L 65/607* (2013.01); *H04N 7/52* (2013.01); *H04N 21/234327* (2013.01); *H04N 21/2385* (2013.01)

(58) Field of Classification Search
CPC .................................................. H04N 21/2385
USPC ................. 370/538, 235, 236, 468, 469, 477; 375/240.1, 240.02; 364/514
See application file for complete search history.

(56) References Cited

U.S. PATENT DOCUMENTS

| 4,903,125 A | 2/1990 | Parker |
| 5,122,875 A | 6/1992 | Raychaudhuri et al. |

(Continued)

FOREIGN PATENT DOCUMENTS

| DE | 4229654 A1 | 4/1993 |
| DE | 4240226 A1 | 6/1994 |

(Continued)

OTHER PUBLICATIONS

De Queiroz R L: "Compression of compound documents" Image Processing, 1999. ICIP 99. Proceedings. 1999 International Conference on—Kobe, Japan Oct. 24-28, 1999, IEEE, Piscataway, NJ, USA LNKD-DOI : 10.1109/ICIP. 1999.821599, vol . 1, pp. 209-213, XP010369260 ISBN: 978-0-7803-5467-8.

(Continued)

*Primary Examiner* — Andrew Lai
*Assistant Examiner* — Andrew C Lee
(74) *Attorney, Agent, or Firm* — Arent Fox LLP

(57) ABSTRACT

A system and method for multimedia data transmission including pooling, by a computer, at least first and second multimedia data streams together in a single channel, wherein each stream defines a respective sequence of frames and each frame includes at least a base layer and at least one enhancement layer; dynamically establishing, by the computer, first and second bit rates respectively associated with the first and second streams; and transmitting, by a transmitter, the at least first and second streams on the channel.

18 Claims, 2 Drawing Sheets

(56) References Cited

U.S. PATENT DOCUMENTS

| | | | |
|---|---|---|---|
| 5,168,356 A | 12/1992 | Acampora et al. | |
| 5,193,000 A * | 3/1993 | Lipton et al. | 348/43 |
| 5,216,503 A * | 6/1993 | Paik et al. | 348/390.1 |
| 5,313,279 A | 5/1994 | Wang et al. | |
| 5,377,194 A | 12/1994 | Calderbank | |
| 5,467,132 A | 11/1995 | Fazel et al. | |
| 5,515,377 A * | 5/1996 | Horne et al. | 370/395.64 |
| 5,544,328 A | 8/1996 | Seshadri | |
| 5,581,653 A | 12/1996 | Todd | |
| 5,603,058 A * | 2/1997 | Belknap et al. | 710/35 |
| 5,621,660 A * | 4/1997 | Chaddha et al. | 709/247 |
| 5,629,736 A * | 5/1997 | Haskell et al. | 348/386.1 |
| 5,844,922 A | 12/1998 | Wolf et al. | |
| 5,852,565 A * | 12/1998 | Demos | 708/203 |
| 5,914,962 A * | 6/1999 | Fimoff et al. | 370/538 |
| 5,960,081 A | 9/1999 | Vynne et al. | |
| 5,966,120 A * | 10/1999 | Arazi et al. | 715/724 |
| 5,970,098 A * | 10/1999 | Herzberg | 375/264 |
| 6,014,466 A | 1/2000 | Xia et al. | |
| 6,038,256 A * | 3/2000 | Linzer et al. | 375/240.12 |
| 6,055,012 A * | 4/2000 | Haskell et al. | 348/48 |
| 6,094,636 A * | 7/2000 | Kim | 704/500 |
| 6,108,625 A * | 8/2000 | Kim | 704/229 |
| 6,147,823 A * | 11/2000 | Matsumi et al. | 360/8 |
| 6,148,005 A * | 11/2000 | Paul et al. | 370/469 |
| 6,209,116 B1 | 3/2001 | Hammons, Jr. et al. | |
| 6,223,324 B1 | 4/2001 | Sinha et al. | |
| 6,233,017 B1 * | 5/2001 | Chaddha | 375/240.12 |
| 6,275,531 B1 | 8/2001 | Li | |
| 6,289,174 B1 | 9/2001 | Hirono | |
| 6,289,485 B1 | 9/2001 | Shiomoto | |
| 6,363,119 B1 * | 3/2002 | Oami | 375/240.03 |
| 6,381,368 B1 | 4/2002 | Kanatsu | |
| 6,480,547 B1 * | 11/2002 | Chen et al. | 375/240.27 |
| 6,490,250 B1 * | 12/2002 | Hinchley et al. | 370/232 |
| 6,496,980 B1 * | 12/2002 | Tillman et al. | 725/90 |
| 6,510,553 B1 * | 1/2003 | Hazra | 725/87 |
| 6,526,177 B1 | 2/2003 | Haskell et al. | |
| 6,580,754 B1 | 6/2003 | Wan et al. | |
| 6,614,930 B1 | 9/2003 | Agnihotri et al. | |
| 6,614,936 B1 * | 9/2003 | Wu et al. | 382/238 |
| 6,637,031 B1 * | 10/2003 | Chou | 725/87 |
| 6,674,796 B1 * | 1/2004 | Haskell et al. | 375/240.01 |
| 6,700,933 B1 * | 3/2004 | Wu et al. | 375/240.16 |
| 6,704,281 B1 * | 3/2004 | Hourunranta et al. | 370/230 |
| 6,714,591 B1 | 3/2004 | Katata et al. | |
| 6,735,633 B1 * | 5/2004 | Welch et al. | 709/233 |
| 6,775,412 B1 | 8/2004 | Nister et al. | |
| 6,788,740 B1 * | 9/2004 | van der Schaar et al. | 375/240 |
| 6,798,838 B1 * | 9/2004 | Ngo | 375/240.19 |
| 6,816,194 B2 * | 11/2004 | Zhang et al. | 375/240.27 |
| 6,879,634 B1 * | 4/2005 | Oz et al. | 375/240.26 |
| 6,957,350 B1 * | 10/2005 | Demos | 380/203 |
| 6,961,383 B1 * | 11/2005 | Reibman et al. | 375/240.25 |
| 7,010,037 B2 * | 3/2006 | Ye et al. | 375/240.1 |
| 7,020,336 B2 * | 3/2006 | Cohen-Solal et al. | 382/204 |
| 7,023,915 B2 * | 4/2006 | Pian et al. | 375/240.02 |
| 7,054,491 B2 * | 5/2006 | McGuinness et al. | 382/209 |
| 7,072,366 B2 * | 7/2006 | Parkkinen et al. | 370/538 |
| 7,093,028 B1 * | 8/2006 | Shao et al. | 709/240 |
| 7,096,481 B1 * | 8/2006 | Forecast et al. | 725/32 |
| 7,116,717 B1 * | 10/2006 | Eshet et al. | 375/240.25 |
| 7,251,225 B2 | 7/2007 | Lundby et al. | |
| 7,274,823 B2 | 9/2007 | Lane et al. | |
| 8,204,079 B2 | 6/2012 | Gardner et al. | |
| 8,737,470 B2 * | 5/2014 | Walker et al. | 375/240.12 |
| 2001/0019589 A1 | 9/2001 | Kim et al. | |
| 2001/0024449 A1 | 9/2001 | Lundby et al. | |
| 2001/0024470 A1 * | 9/2001 | Radha et al. | 375/240.1 |
| 2001/0047423 A1 * | 11/2001 | Shao et al. | 709/235 |
| 2002/0021485 A1 * | 2/2002 | Pilossof | 359/295 |
| 2002/0031122 A1 | 3/2002 | Martini et al. | |
| 2002/0049979 A1 * | 4/2002 | White et al. | 725/87 |
| 2002/0090138 A1 * | 7/2002 | Hamanaka | 382/239 |
| 2002/0094024 A1 * | 7/2002 | Ma et al. | 375/226 |
| 2002/0094025 A1 * | 7/2002 | Hanamura et al. | 375/240.01 |
| 2002/0094031 A1 * | 7/2002 | Ngai et al. | 375/240.27 |
| 2002/0107686 A1 * | 8/2002 | Unno | 704/219 |
| 2002/0116705 A1 * | 8/2002 | Perlman et al. | 725/31 |
| 2002/0146073 A1 | 10/2002 | Clark et al. | |
| 2002/0150158 A1 * | 10/2002 | Wu et al. | 375/240.12 |
| 2002/0152317 A1 | 10/2002 | Wang et al. | |
| 2002/0159457 A1 | 10/2002 | Zhang et al. | |
| 2002/0181580 A1 * | 12/2002 | Van Der Schaar | 375/240.01 |
| 2002/0191676 A1 | 12/2002 | Kenneth | |
| 2003/0076858 A1 * | 4/2003 | Deshpande | 370/468 |
| 2003/0118243 A1 * | 6/2003 | Sezer et al. | 382/245 |
| 2003/0123546 A1 * | 7/2003 | Falik et al. | 375/240.12 |
| 2003/0174773 A1 | 9/2003 | Comaniciu et al. | |
| 2003/0195977 A1 * | 10/2003 | Liu et al. | 709/231 |
| 2003/0197785 A1 * | 10/2003 | White et al. | 348/207.99 |
| 2003/0202579 A1 * | 10/2003 | Lin et al. | 375/240.03 |
| 2003/0206558 A1 * | 11/2003 | Parkkinen et al. | 370/477 |
| 2004/0083417 A1 | 4/2004 | Lane et al. | |
| 2004/0083495 A1 | 4/2004 | Lane et al. | |
| 2006/0005106 A1 | 1/2006 | Lane et al. | |
| 2008/0013838 A1 | 1/2008 | Lane et al. | |

FOREIGN PATENT DOCUMENTS

| | | |
|---|---|---|
| EP | 1162573 A2 | 12/2001 |
| JP | 4287179 | 10/1992 |
| JP | 4363717 | 12/1992 |
| JP | 5037700 | 2/1993 |
| JP | 5276396 A | 10/1993 |
| JP | 11308463 A | 11/1999 |
| JP | 11515153 T | 12/1999 |
| JP | 2001145067 A | 5/2001 |
| JP | 2002142070 A | 5/2002 |
| KR | 19990047501 | 7/1999 |
| KR | 20010063801 A | 7/2001 |
| WO | WO9626582 A1 | 8/1996 |
| WO | 9641438 A1 | 12/1996 |

OTHER PUBLICATIONS

De Queiroz, Ricardo L, et al., "Optimizing Block-Thresholding Segmentation for Multilayer Compression of Compound Images" IEEE Transactions On Image Processing, IEEE Service Center, Piscataway, NJ, US, vol . 9, No. 9, Sep. 1, 2000, XP011025650 ISSN: 1057-7149.

Dimitrova N, et al., "MPEG-7 Videotext description scheme for superimposed text in images and video", Signal Processing Image Communication, Elsevier Science Publishers, Amsterdam, NL LNKD-DOI : 10.1016/S0923-5965(00)00022-9, vol . 16, No. 1-2, Sep. 1, 2000 , pages 1-19, XP004216273 ISSN: 0923-5965.

Ebrahimi T, et al., "MPEG-4 Natural Video Coding-An Overview" Signal Processing Image Communication, Elsevier Science Publishers, Amsterdam, NL LNKD-DOI : 10.1016/S0923-5965(99)00054-5, vol. 15, No. 4/05, Jan. 1, 2000, pp. 1-33, XP000961469 ISSN: 0923-5965.

Hannuksela, M., et al. "Sup-Picture: ROI Coding and Unequal Error Protection", IEEE International Conference on Image Processing ICIP 2002, Rochester New York, Sep. 22, 2002 XP010607773; pp. 537-540.

International Search Report—PCT/US2003/034271—International Search Authority, European Patent Office, Mar. 4, 2004.

International Search Report—PCT/US2003/034503—International Search Authority, European Patent Office—Jun. 26, 2008.

International Search Report—PCT/US2003/036086—International Search Authority, European Patent Office, Aug. 10, 2006.

Jinzenji K, et al., "MPEG-4 Very Low Bit-rate Video Compression Using Sprite Coding" Aug. 22-25, 2001, pp. 5-8, XP010661759 ISBN: 978-0-7695-1198-6.

Lee, Chee-Siong et al: "OFDM-Based 1-59 Turbo-Coded Hierarchical and A Non-Hierarchical Terrestrial Mobile Digital Video Broadcasting" IEEE Transactions On Broadcasting, IEEE Service Center, Piscataway, NJ, US, vol. 46, No. 1, Mar. 1, 2000, XPOII006116 ISSN: 0018-9316 * p. 1, col. 2, lines 25-30 * section "V. Data Partitioning Scheme".

(56) References Cited

OTHER PUBLICATIONS

Martini M G, et al., "Wireless Transmission of MPEG-4 Video: Performance Evaluation of Unequal Error Protection Over a Block Fading Channel", Proc. IEEE VTC 2001, vol. 3 of 4. Conf. 53, May 6, 2001, pp. 2056-2060, XP001082505 Rhodes, Greece ISBN: 0-7803-6728-6.
Mixed Raster Content (MRC) ITU-T Recommendation T .44, XX, XX, vol. T. 44, Jan. 1, 1999, pp. 1-31, XP000955907.
Supplemental European Search Report—EP03781515, European Search Authority—Munich—Feb. 11, 2010.
Supplemental European Search Report—EP03786544, European Search Authority—Munich—Nov. 3, 2005.
Supplementary European Search Report—EP03768910, Search Authority—The Hague Patent Office, Nov. 12, 2010.
Weck C: "Optimierung der Empfangqualitat durch angepassten Fehlerschutz bei DAB" ITG-Fachberichte, VDE Verlag, Berlin, DE, vol. 118, Feb. 18, 1992, pp. 109-112, XP000610435 ISSN: 0932-6022.
Yan, Wei-Qi, et al., "Erasing video logos based on image inpainting" Multimedia And Expo, 2002. ICME '02. Proceedings. 2002 IEEE Internatio Nal Conference On Lausanne, Switzerland Aug. 26-29, 2002, Piscataway, NJ, USA,IEEE, US, vol. 2, pp. 521-524, XP010604812 ISBN: 978-0-7803-7304-4.
Yung, Chi Wai et al., "Unequal Error Protection For Wireless Transmission of MPEG Audio", IEEE ISCAS 1999, vol . 6, May 30, 1999, pp. 342-345, XP010341642 Orlando, FL, USA ISBN: 0-7803-5471-0.
Zhang T, et al., "Unequal Packet Loss Protection For Layered Video Transmission" IEEE Transactions On Broadcasting, IEEE Inc. New York, US, vol. 45, No. 2, Jun. 1999, pp. 243-252, XP000851913 ISSN: 0018-9316.
De Queiroz R.L., et al., "On data filling algorithms for MRC layers", Image Processing, 2000. Proceedings. 2000 International Conference on Sep. 10-13, 2000, IEEE, Piscataway, NJ, USA, vol. 2, pp. 586-589, XP010530052—ISBN 978-0-7803-6297-0.
McIntyre L., et al., "Draft Recommendation T.44, Mixed Raster Content (MRC);21", ITU-T Draft ; Study Period 1997-2000, International Telecommunication Union, Geneva; CH, vol. 5/8, May 1, 1997, pp. 1-29, XP017478345, [retrieved on Aug. 21, 2003].

\* cited by examiner

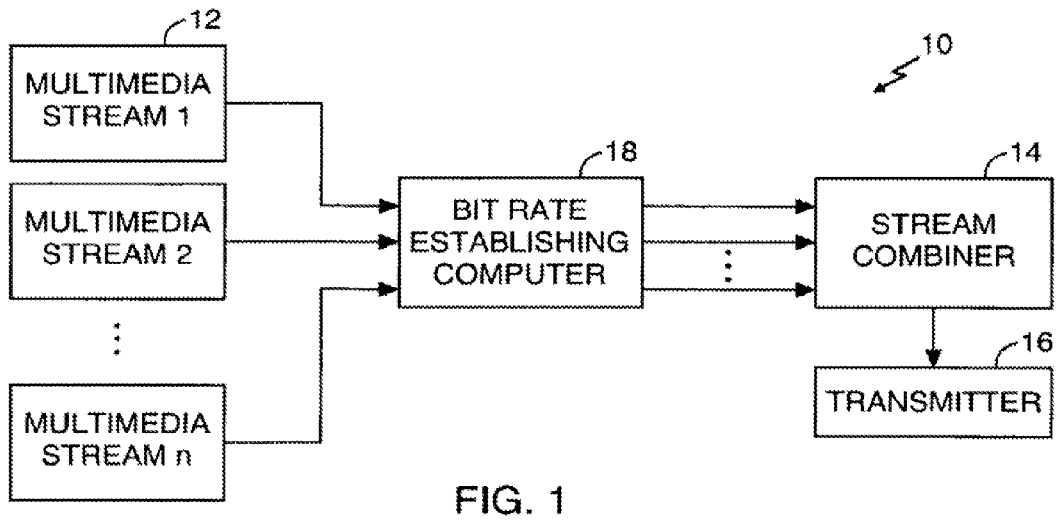
FIG. 1
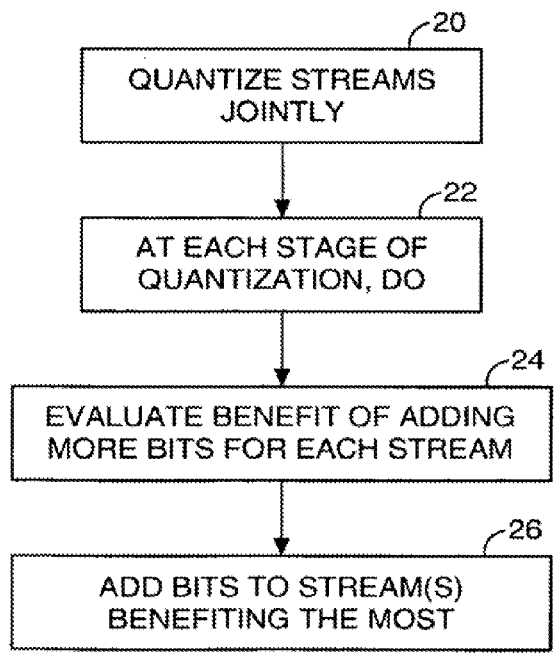
FIG. 2 - JOINT STREAM QUANTIZATION LOGIC

FIG. 3 - ENHANCEMENT LAYER LOGIC

(28) RECEIVE LAYERS OF STREAMS W/ PERCEPTUAL BENEFITS
(30) DISCARD LAYER(S) ADDING LEAST BENEFIT

| TRANSMISSION PERIOD # | 1 | 2 | 3 | 4 | 5 |
|---|---|---|---|---|---|
| STREAM 1 BASE LAYER QOS (dB) | 12 | 12 | 5 | 12 | 12 |
| STREAM 1 QOS W/ENHANCEMENT LAYER #1 | 15 | 15 | 10 | 15 | 15 |
| STREAM 1 QOS W/ENHANCEMENT LAYER #2 | ~~17~~ | ~~17~~ | 14 | ~~17~~ | ~~17~~ |
| STREAM 2 BASE LAYER QOS | 11 | 4 | 11 | 11 | 11 |
| STREAM 2 QOS W/ENHANCEMENT LAYER #1 | 14 | 7 | 14 | 14 | 14 |
| STREAM 2 QOS W/ENHANCEMENT LAYER #2 | 16 | 10 | ~~16~~ | 16 | 16 |

JOINT TRANSMISSION OF MULTIPLE MULTIMEDIA STREAMS

CROSS-REFERENCE TO RELATED APPLICATIONS

The present U.S. application for Patent is a continuation of U.S. patent application. Ser. No. 10/282,797, entitled "JOINT TRANSMISSION OF MULTIPLE MULTIMEDIA STREAMS," filed Oct. 28, 2002, now U.S. Pat. No. 8,204,079, and assigned to the assignee hereof and hereby expressly incorporated by reference herein in its entirety.

FIELD OF THE INVENTION

The present disclosure relates generally to multimedia transmission.

BACKGROUND

Multimedia such as video and audio can be transmitted over a number of paths, including cable, the Internet, and broadcast. For instance, satellite or terrestrial broadcast stations can be used to transmit multimedia to mobile computing devices such as mobile telephones.

Typically, multimedia data is voluminous, which means that significant transmission path bandwidth, unfortunately a finite resource, must be used. This is particularly the case for high fidelity multimedia, e.g., high resolution video. That is, the higher the quality of service being provided, the more bandwidth must be used.

As recognized by the present disclosure, several multimedia streams can be pooled together in a single channel. The channel might have a constant overall bandwidth in terms of bit rate, i.e., the number of bits that can be transmitted in the channel per unit time cannot exceed the "bandwidth" of the channel. Typically, each stream in the channel will be accorded a fixed fraction of the bandwidth. Accordingly, the bit rate for each multimedia stream typically is fixed.

As further recognized by the present disclosure, however, a multimedia stream might require a higher bit rate for a given quality of service (QOS) some of the time and a lower bit rate for the same QOS at other times. As an example, in a video stream, when the video sequence makes a hard cut (i.e., a large amount of pixel changes are taking place), a higher bit rate is required to achieve the same QOS as could be achieved at other times with a lower bit rate when relatively little action is taking place. Or, in terms of audio streams, a higher bit rate might be required at the beginning of a speech or music segment than at other times during the stream to achieve the same QOS.

Having made the above critical recognitions, the present disclosure further understands that one multimedia stream in a channel might require a relatively low bit rate at the same time that another stream in the channel might require a relatively high bit rate, and that it consequently would be desirable to allocate the limited overall bandwidth of the channel in a way that can account for this.

SUMMARY

The present invention is a system and method for partitioning a bandwidth of a single channel among plural multimedia streams in a time varying manner.

Accordingly, a method for multimedia data transmission includes pooling at least first and second multimedia data streams together in a single channel. The method also includes dynamically establishing first and second bit rates respectively associated with the first and second streams, in light of channel bandwidth constraints. The channel may be a broadcast channel. For the purposes of the non-limiting embodiment below, a "base layer" may be defined as the most important part of the bits stream which, if successfully received, decoded, and presented to the user, would result in a baseline level of video, audio, or other multimedia stream acceptable to the user. On the other hand, an "enhancement layer" would, when combined with the base layer, enhance or improve the quality, frequency, signal-to-noise ratio, etc. of the multimedia stream when presented to the user, compared to that of the base layer alone.

In one non-limiting embodiment, each stream defines a respective sequence of frames and each frame includes a base layer and at least one enhancement layer. At least one of the enhancement layers is dynamically selected for omission from the channel for at least some frames. The selection can be based on a quality of service (QOS) metric such as signal-to-noise ratio, or by program stream importance. In an illustrative non-limiting example, the enhancement layer selected for omission in a frame is the layer providing the highest overall QOS to its respective stream among the enhancement layers of the other streams that are being simultaneously transmitted in that frame. This limits the total bandwidth of the combined frames so that it does not exceed the channel bandwidth, while providing a minimum QOS to each stream.

In another non-limiting embodiment, the streams can be quantized jointly. In this circumstance, during quantization, a benefit of adding bits to the stream for each stage of quantization is evaluated, and bits are added (or not) to the stream based thereon, in light of channel bandwidth constraints.

As another alternative, the bit rates can be established to establish surplus channel bandwidth that is useful for sending ancillary data.

In another aspect, a computer executes logic that includes partitioning a bandwidth of a single channel among plural multimedia streams in a time varying manner.

In still another aspect, a system for transmitting at least first and second multimedia streams in a single channel includes means for establishing a first bit rate for the first stream during a first frame of the first stream. The system also includes means for establishing a second bit rate for the first stream during a second frame of the first stream, with the first and second bit rates being different from each other.

The details of the present disclosure, both as to its structure and operation, can best be understood in reference to the accompanying drawings, in which like reference numerals refer to like parts, and in which:

BRIEF DESCRIPTION OF THE DRAWINGS

FIG. 1 is a block diagram of the present architecture;

FIG. 2 is a flow chart of the logic for dynamically establishing the bit rates of the streams during joint quantization of the streams;

FIG. 3 is a flow chart of the logic for dynamically establishing the bit rates of the streams when enhancement layers are used.

DETAILED DESCRIPTION OF THE PREFERRED EMBODIMENT

Figure 4:
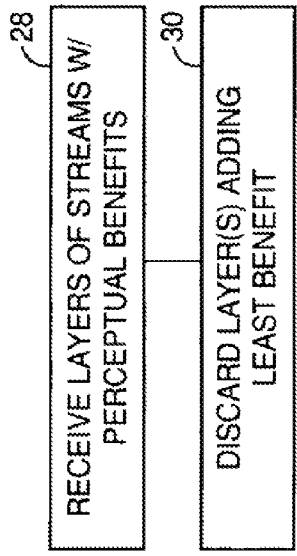
FIG. 4 is a table schematically showing base layers and enhancement layers of two streams.

Referring initially to FIG. 1, a system is shown, generally designated 10, that dynamically establishes the bit rate of each of plural multimedia streams 12 that are combined by a stream combiner 14 and broadcast together in a single channel by a transmitter 16. More particularly, the bit rates of the streams 12 are dynamically established in accordance with the logic below by a bit rate establishing computer 18, prior to being combined into a single channel and transmitted in accordance with principles known in the art.

The non-limiting preferred embodiment shown in FIG. 1 shows a multimedia transmitter 16 that uses wireless means, and more particularly that uses code division multiple access (CDMA) principles. The streams can be broadcast to plural receivers if desired, or transmitted using point-to-point wireless transmission principles. It is to be understood that the present principles apply to other forms of wireless communication such as GSM, TDMA, wideband CDMA, OFDM, etc. as well as transmission of multimedia over cable systems, the Internet, etc. As used herein in the singular, "multimedia stream" means a single stream representing a single program, e.g., a single music piece or a single television show or movie potentially with accompanying text, images, etc.

As disclosed below, the dynamic allocation of bandwidth can depend on perceived levels of quality based on some objective measure. Quality of service (QOS) is one such measure. QOS can be measured in several ways, such as, for example, by signal to noise ratio as expressed in decibels.

Referring to FIG. 2, as indicated at block 20 the streams 12 may be quantized jointly with each other using, e.g., MPEG audio and video quantization principles known in the art. Under these circumstances the logic moves to block 22 which indicates that at each stage of quantization, e.g., for each frame to be quantized, blocks 24 and 26 are undertaken.

Moving to block 24, the benefit of adding more bits to each stream for the stage under test than are currently allocated are evaluated. This evaluation can be done iteratively, starting with a default number of bits that represents a minimum QOS, for a predetermined number of iterations, or until a predetermined "benefit" threshold is reached, and always under the constraint that the total number of bits per unit time allocated to the plural streams remains within the channel bandwidth. As mentioned above, the evaluation can be based on a perceived level of quality based on some objective measure such as QOS as indicated by, for example, signal to noise ratios as expressed in decibels.

Once the evaluations for the stage under test are completed for each stream, the logic moves to block 26. At block 26, bits are added to the stream or streams that show the highest improvement in benefit from the addition of bits, within the constraint of the channel's bandwidth. Stated differently, the bit rates of the streams are dynamically optimized for each frame using a user-defined protocol.

"Quantization" is discussed below. It should be noted that quantization could be fixed but may also be variable in addition to the number of layers used, and that in some embodiments bandwidth allocation consequently can be fully independent of quantization.

Some schemes such as MPEG4 allow for so-called "enhancement layers" of bits during quantization. As mentioned above, a "base layer" is provided for each frame for each stream that represents a minimum amount of data necessary to render the frame, with enhancement layers for the frame being available to add fidelity to the image or sound provided by the base layer. The benefit provided by the increased bit rate resulting from the addition of the enhancement layers can be indicated along with the enhancement layers themselves.

Recognizing this, block 28 of FIG. 3 shows that the base layer of each frame of each stream, along with the associated enhancement layer or layers, are received at block 28. Also, a QOS measure is provided along with each layer that indicates the amount of "benefit" associated with the layer. At block 30, to conserve overall channel bandwidth the enhancement layer (s) that add the least benefit for the particular set of stream frames (for "n" streams, there will be "n" frames in the set) are discarded. Other metrics of bandwidth allocation can be used, such as the relative importance of the competing streams, number of subscribers for competing streams, presence of commercials in the streams, and number of users in a particular zone of coverage who desire a particular stream. Indeed, in some circumstances it may be desirable to remove a particular stream altogether, i.e., base layer and enhancement layer.

FIG. 4 illustrates one preferred, non-limiting logic for undertaking this. For illustration purposes, FIG. 4 assumes that two streams are to be transmitted in a single channel, with each stream having a base layer for each frame and potentially two enhancements layers per frame. The numbers in the table of FIG. 4 represent QOS and specifically cumulative signal-to-noise (SNR) ratios as represented in decibels.

FIG. 4 also assumes that the dynamic bit rate protocol being used essentially seeks to establish a minimum QOS for each stream for each frame, and that the channel has a bandwidth that is sufficient only to carry five of the six layers at a time, i.e., FIG. 4 assumes that the channel can carry only five layers per transmission period. Accordingly, the enhancement layer providing the highest SNR for a period is omitted in the exemplary non-limiting protocol represented by FIG. 4. That is, the second enhancement layer of the first stream provides a cumulative db level of "17" for periods 1, 2, 4, and 5, which is higher than the cumulative db level provided by any other layer for those periods, and so is discarded for periods 1, 2, 4, and 5. On the other hand, the second enhancement layer of the second stream provides a cumulative db level of "16" for period 3, which is higher than the cumulative db level provided by any other layer for period 3, and so is discarded for the third period.

It is to be understood that other protocols and other measures of QOS can be used without departing from the scope of the present disclosure. For example, any enhancement layer providing a cumulative SNR for any particular frame or period that is higher than a predetermined threshold can be omitted.

Or, as another example, if stream A has a base layer quality of four (4) db and, with an enhancement layer, a quality of eight (8) db, and stream B has a base layer quality of ten (10) db and, with an enhancement layer, a quality of thirty (30) db, one of two heuristics can be applied to determine which enhancement layer to omit. If the enhancement providing the greatest overall benefit of any enhancement layer is to be maintained, the enhancement layer of stream A would be omitted. However, if it is desired to provide the best quality for the worst stream, the enhancement layer for stream B can be omitted.

Alternatively to allocating the entire channel bandwidth to the multimedia streams, the principles above can be used to reduce the bandwidth needed by each stream so that surplus channel bandwidth is obtained. The surplus bandwidth can be used to send real-time ancillary data to augment one or more of the streams (e.g., character overlays, graphics, etc.) or to send non-real time ancillary data such as a picture display during a song or ordering information, to augment a stream. Yet again, the surplus bandwidth can be used to send other broadcast data, system control data, programming data, encryption keys, subscription or programming information, etc.

While the particular JOINT TRANSMISSION OF MULTIPLE MULTIMEDIA STREAMS as herein shown and described in detail is fully capable of attaining the above-described objects of the present disclosure, it is to be understood that it is the presently preferred embodiment of the present disclosure and is thus representative of the subject matter which is broadly contemplated by the present disclosure, that the scope of the present invention fully encompasses other embodiments which may become obvious to those skilled in the art, and that the scope of the present invention is accordingly to be limited by nothing other than the appended claims, in which reference to an element in the singular is not intended to mean "one and only one" unless explicitly so stated, but rather "one or more". All structural and functional equivalents to the elements of the above-described preferred embodiment that are known or later come to be known to those of ordinary skill in the art are expressly incorporated herein by reference and are intended to be encompassed by the present claims. Moreover, it is not necessary for a device or method to address each and every problem sought to be solved by the present invention, for it to be encompassed by the present claims. Furthermore, no element, component, or method step in the present disclosure is intended to be dedicated to the public regardless of whether the element, component, or method step is explicitly recited in the claims. No claim element herein is to be construed under the provisions of 35 U.S.C. '112, sixth paragraph, unless the element is expressly recited using the phrase "means for" or, in the case of a method claim, the element is recited as a "step" instead of an "act".

What is claimed is:

1. A method for multimedia data transmission, comprising:
    pooling, by a computer, at least first and second multimedia data streams together in a single channel, wherein each of the at least first and second multimedia data streams defines a respective sequence of frames and each frame includes at least a base layer and at least one enhancement layer;
    dynamically establishing, by the computer, a first bit rate for the first multimedia data stream comprising a first base layer and at least one first enhancement layer and a second bit rate for the second multimedia data stream comprising a second base layer and at least one second enhancement layer, wherein one of the first bit rate and the second bit rate is established, at each stage of quantization, based on an evaluation of both the first multimedia data stream and the second multimedia data stream, wherein the evaluation of both the first multimedia data stream and the second multimedia data stream comprises evaluating, by the computer, a benefit of adding bits to each of the at least first and second multimedia data streams during the each stage of quantization; and
    transmitting, by a transmitter, the at least first and second multimedia data streams on the channel.

2. The method of claim 1, wherein the channel is one of:
    a broadcast channel, a multicast channel, and a unicast channel.

3. The method of claim 1, wherein either the first or second multimedia data stream is constituted using an MPEG principle.

4. The method of claim 1, wherein the at least first and second multimedia data streams are quantized jointly.

5. The method of claim 1, wherein dynamically establishing the first and second bit rates is based at least partially on the evaluation.

6. The method of claim 1, wherein the first and second bit rates are established to provide surplus channel bandwidth useful for sending ancillary data.

7. The method of claim 1, wherein the evaluating, by the computer, the benefit of adding bits to each of the at least first and second multimedia data streams during the each stage of quantization is further based on a quality of service metric.

8. The method of claim 1, wherein the evaluating, by the computer, the benefit of adding bits to each of the at least first and second multimedia data streams during the each stage of quantization is further based on a bandwidth of the channel.

9. A non-transitory computer readable storage medium comprising computer-executable instructions for execution by a processor on a computer to perform method steps comprising:
    pooling at least first and second multimedia data streams together in a single channel, wherein each of the at least first and second multimedia data streams defines a respective sequence of frames and each frame includes at least a base layer and at least one enhancement layer;
    dynamically establishing a first bit rate for the first multimedia data stream comprising a first base layer and at least one first enhancement layer and a second bit rate for the second multimedia data stream comprising a second base layer and at least one second enhancement layer, wherein one of the first bit rate and the second bit rate is established, at each stage of quantization, based on an evaluation of both the first multimedia data stream and the second multimedia data stream, wherein the evaluation of both the first multimedia data stream and the second multimedia data stream comprises an evaluation of a benefit of adding bits to each of the at least first and second multimedia data streams during the each stage of quantization; and
    transmitting the at least first and second multimedia data streams on the channel.

10. The non-transitory computer readable storage medium of claim 9, wherein the channel is at least one of:
    a broadcast channel, a multicast channel, and a unicast channel.

11. The non-transitory computer readable storage medium of claim 9, wherein either the first or second multimedia data stream is constituted using MPEG principles.

12. The non-transitory computer readable storage medium of claim 9, wherein dynamically establishing the first and second bit rates at least in part depends on the evaluation.

13. The non-transitory computer readable storage medium of claim 9, wherein the first and second bit rates are established to provide surplus channel bandwidth useful for sending ancillary data.

14. The non-transitory computer readable storage medium of claim 9, wherein the method uses at least one relative importance metric.

15. A system for multimedia data transmission, comprising:
    a computer configured to pool at least first and second multimedia data streams together in a single channel, wherein each of the at least first and second multimedia data streams defines a respective sequence of frames and each frame includes at least a base layer and at least one enhancement layer, and
    dynamically establish a first bit rate for the first multimedia data stream comprising a first base layer and at least one first enhancement layer and a second bit rate for the second multimedia data stream comprising a second base layer and at least one second enhancement layer, wherein one of the first bit rate and the second bit rate is established, at each stage of quantization, based on an evaluation of both the first multimedia data stream and the second multimedia data stream, wherein the evaluation of both the first multimedia data stream and the second multimedia data stream comprises an evaluation of a benefit of adding bits to each of the at least first and second multimedia data streams during the each stage of quantization; and a transmitter configured to transmit the at least first and second multimedia data streams.

16. The system of claim 15, wherein either the first or second multimedia data stream is constituted using an MPEG principle.

17. The system of claim 15, further comprising a quantizer configured to quantize the at least first and second multimedia data streams jointly.

18. The system of claim 15, wherein the first and second bit rates are established to provide surplus channel bandwidth useful for sending ancillary data.

* * * * *